(12) United States Patent
Fujimoto et al.

(10) Patent No.: US 7,341,771 B2
(45) Date of Patent: Mar. 11, 2008

(54) ACTIVE ENERGY RAY CURABLE COMPOSITION FOR COATING OPTICAL DISK AND OPTICAL DISK

(75) Inventors: Juichi Fujimoto, Aichi (JP); Kouji Hayama, Aichi (JP); Seiji Nushi, Aichi (JP); Hiroshi Fukushima, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 11/389,265

(22) Filed: Mar. 27, 2006

(65) Prior Publication Data

US 2006/0167200 A1 Jul. 27, 2006

Related U.S. Application Data

(62) Division of application No. 10/432,360, filed as application No. PCT/JP01/10479 on Nov. 30, 2001.

(30) Foreign Application Priority Data

| Nov. 30, 2000 | (JP) | ............................. 2000-364689 |
| Nov. 30, 2000 | (JP) | ............................. 2000-364690 |
| Jul. 18, 2001 | (JP) | ............................. 2001-217725 |

(51) Int. Cl.
*B32B 3/02* (2006.01)

(52) U.S. Cl. ...................... 428/64.1; 427/379; 436/73; 522/11; 522/14; 526/329.7

(58) Field of Classification Search ............... 428/64.1; 522/14, 11; 526/329.7; 436/73; 427/379
See application file for complete search history.

(56) References Cited

U.S. PATENT DOCUMENTS

| 4,153,776 A | * | 5/1979 | Friedlander et al. | ........... 528/49 |
| 4,606,994 A | * | 8/1986 | Illers et al. | ................. 430/300 |
| 4,654,233 A | | 3/1987 | Grant et al. | ................. 427/379 |
| 4,666,952 A | * | 5/1987 | Henne et al. | ................. 522/14 |
| 4,735,998 A | * | 4/1988 | Itoh et al. | .................... 525/342 |
| 4,985,472 A | * | 1/1991 | Aosai et al. | .................... 522/64 |
| 5,281,797 A | * | 1/1994 | Tatsuno et al. | .......... 250/201.5 |
| 5,480,596 A | * | 1/1996 | Okubo et al. | ............... 264/1.33 |
| 5,518,818 A | * | 5/1996 | Kidai et al. | .................. 428/412 |
| 6,072,762 A | * | 6/2000 | Kume et al. | ................. 369/116 |
| 6,075,065 A | * | 6/2000 | Yamazaki et al. | ............. 522/64 |
| 6,383,596 B1 | * | 5/2002 | Arioka et al. | ............... 428/64.1 |
| 6,437,017 B1 | * | 8/2002 | Komaki | ....................... 522/182 |
| 7,132,460 B2 | * | 11/2006 | Fujimoto et al. | ............. 522/14 |

FOREIGN PATENT DOCUMENTS

| GB | 2017128 A | * | 10/1979 |
| JP | 61-208646 | | 9/1986 |
| JP | 3-41174 | | 2/1991 |
| JP | 3-131605 | | 6/1991 |
| JP | 4-264167 | | 9/1992 |
| JP | 5-89518 | | 4/1993 |
| JP | 6-195749 | | 7/1994 |
| JP | 8-329520 | | 12/1996 |
| JP | 9-138976 | | 5/1997 |
| JP | 10-302309 | | 11/1998 |
| JP | 11-12495 | | 1/1999 |
| JP | 11-31337 | | 2/1999 |
| JP | 2000-63549 | | 2/2000 |
| JP | 2000-289172 | | 10/2000 |
| WO | WO 96/24928 | | 8/1996 |
| WO | WO-02/44285 A1 | * | 6/2002 |

OTHER PUBLICATIONS

U.S. Appl. No. 11/389,266, filed Mar. 27, 2006, Fujimoto et al.
U.S. Appl. No. 11/389,265, filed Mar. 27, 2006, Fujimoto et al.
Patent Abstracts of Japan—English Abstract of JP 03-131605, Jun. 5, 1991.
Patent Abstracts of Japan—English Abstract of JP 03-041174, Feb. 21, 1991.
Patent Abstracts of Japan—English Abstract of JP 04-264167, Sep. 18, 1992.
Patent Abstracts of Japan—English Abstract of JP 61-208646, Sep. 17, 1986.
Patent Abstracts of Japan—English Abstract of JP 05-089518, Apr. 5, 1993.
Patent Abstracts of Japan—English Abstract of JP 2000-289172, Oct. 17, 2000.
Patent Abstracts of Japan—English Abstract of JP 11-031337, Feb. 2, 1999.
XP-002280407 English Abstract of J-04212734, Aug. 4, 1992.

* cited by examiner

*Primary Examiner*—Peter D. Mulcahy
*Assistant Examiner*—Henry S. Hu
(74) *Attorney, Agent, or Firm*—Oblon, Spivak, McClelland, Maier & Neustadt, P.C.

(57) ABSTRACT

The present invention relates to an active energy ray curable composition for coating optical disc, comprising a urethane (meth)acrylate compound having at least one amide group in the molecule, an ethylenically unsaturated compound other than the urethane (meth)acrylate compound and a photopolymerization initiator; and an optical disc having a cured coating layer obtained by curing the composition.

7 Claims, No Drawings

ACTIVE ENERGY RAY CURABLE COMPOSITION FOR COATING OPTICAL DISK AND OPTICAL DISK

TECHNICAL FIELD

The present invention relates to an active energy ray curable composition for coating optical disc, and an optical disc, and more particularly, to an active energy ray curable composition capable of forming a transparent cured coating layer showing low volume shrinkage coefficient in polymerization and having sufficient mechanical strength, and an optical disc having a cured coating layer particularly transparent for blue light, obtained by curing the above-mentioned curable composition.

BACKGROUND ART

Recently, there are used a lot of optical discs such as compact discs, once write type optical discs, magneto-optical discs and phase change type optical discs as information recording media. These optical discs are generally produced by methods in which a thin metal film stack working as a recording layer or light reflection layer is formed by a sputtering method on a recording surface of a transparent resin substrate made of polycarbonate and the like on which fine patterns such as pits and grooves have been formed, and for preventing deterioration of these layers, a protective layer having a thickness of about 5 to 20 µm is formed with a ultraviolet ray curable type resin.

On the other hand, recently, widely spreading as those having enhanced recording capacity are, for example, DVD (digital video disc or digital versatile disc) produced by bonding optical disc substrates having a thickness of 0.6 mm, described in Japanese Patent Application Laid-Open (JP-A) No. 8-212597.

Further, JP-A No. 8-235638 suggests an optical disc as a high density optical disc having improved recording capacity than that of DVD and capable of recording high quality video data and the like for a long period of time. This high density optical disc is an optical disc which is obtained by forming a recording layer on a transparent or opaque substrate made of a plastic and the like then laminating an optical transmittance layer having a thickness of about 100 µm on the recording layer and to which recording light and/or reading light is directed through the optical transmittance layer. Regarding this high density optical disc, there is a suggestion, as described in JP-A No. 11-273147, of further increasing density by short wavelength recording utilizing laser ray having a wavelength of, for example, 400 nm which is shorter than that of red laser conventionally used for recording and/or reading of optical information media such as compact discs and DVD.

As methods of forming this optical transmittance layer, there are listed (1) a method in which a transparent film having a thickness of 100 µm is pasted on a recording layer using an adhesive, (2) a method in which an ultraviolet ray curable resin placed on a recording layer is pushed to spread to obtain desired thickness with a flat transparent plate made of glass and the like, and cured by irradiation with ultraviolet ray via this plate, and the plate is released to give an optical transmittance layer, (3) a method in which an ultraviolet ray curable resin is applied on a recording layer by a spin coating method, then, irradiated with ultraviolet ray to obtain an optical transmittance layer.

As the ultraviolet ray curable resin used for formation of such an optical transmittance layer, there are listed, for example, compositions described in JP-A Nos. 3-131605 and 4-264167. There can also be used ultraviolet ray curable resins for transfer of optical disc stamper, for formation on a transparent substrate of tracking grooves described in JP-A Nos. 61-208646, 62-88156 and 5-59139.

However, when an optical transmittance layer of a high density type optical disc described above is formed using ultraviolet ray curable resins described in JP-A Nos. 3-131605, 4-264167, 61-208646 and 62-88156, there is a practical problem that significant skew occurs on an optical disc since the ultraviolet ray curable resin has high volume shrinkage coefficient. With respect to a composition described in JP-A No. 5-59139, when a composition of ratio causing no skew is prepared, there occurs a problem that the resulting cured substance has poor hardness, leading to difficulty in making balance between hardness and skew. With a composition adopted in examples described in this publication, significant skew occurs though hardness is high.

JP-A No. 54-127994 describes a coating composition containing a specific amide-modified urethane acrylate radiation-curable compound. However, this coating composition is used for formation of a protective coating film of a vinyl cover, and is a composition used in the field utterly different from a coating layer of an optical disc. Further, the object of inclusion of a urethane acrylate in this coating composition is to impart bending strength and tensile strength to a cured film, and based on a viewpoint irrelevant to problems (e.g. volume shrinkage) specific to a coating layer of an optical disc as described above.

DISCLOSURE OF INVENTION

An object of the invention is to provide an active energy ray curable composition for coating optical disc, capable of forming a cured coating layer (protective layer) showing low volume shrinkage coefficient in polymerization, having excellent transparency, and having excellent hardness, ability to protect a recording layer and mechanical properties, and an optical disc having a cured coating layer obtained by curing this composition.

The present invention relates to an active energy ray curable composition for coating optical disc, comprising a urethane (meth)acrylate compound (A) having at least one amide group in the molecule, an ethylenically unsaturated compound (B) other than the urethane (meth)acrylate compound (A) and a photopolymerization initiator (C); and an optical disc having a cured coating layer obtained by curing the composition.

Further, the present invention relates to an optical disc comprising a substrate carrying thereon a recording layer and a cured coating layer laminated in this order in which the cured coating layer acts as an incident side surface for recording light and/or reading light, wherein the cured coating layer is a layer obtained by curing a curable composition having a volume shrinkage coefficient of 7.5% or less, having a pencil hardness of 2B or more, and having a beam transmittance in the wavelength range from 380 to 800 nm of 75% or more.

BEST MODES FOR CARRYING OUT THE INVENTION

The active energy ray curable composition of the present invention will be illustrated.

The active energy ray curable composition of the present invention can form a transparent cured coating layer for optical disc, having low volume shrinkage coefficient and having mechanical strength.

The urethane (meth)acrylate compound (A) having at least one amide group in the molecule used in the composition of the present invention is a component imparting a low shrinkage property to the composition and durabilities such as hardness and impact resistance to the resulting cured coating layer (protective layer). In the present invention, (meth)acrylate is a generic name for acrylate and methacrylate.

The urethane (meth)acrylate compound (A) is not particularly restricted, and in the case of formation of a cured coating layer having a thickness of about 100 μm, for example, urethane (meth)acrylates obtained by reacting the following components (a1) to (a4) are suitable:
  (a1) Amide-containing compounds having at least one amide group and at least two hydroxy groups in the molecule,
  (a2) Poly-hydric alcohol compounds other than the above-mentioned component (a1),
  (a3) Diisocyanate compounds,
  (a4) Hydroxy group-containing (meth)acrylates.

The amide-containing compound (a1) having at least one amide group and at least two hydroxy groups in the molecule is a component having an action of improving mechanical strength (toughness) while maintaining the low shrinkage property of the cured coating layer. As this component (a1), there are listed, for example, reaction products of cyclic hydroxycarboxylates with ammonia or amine compounds containing one primary or secondary amino nitrogen.

Specific examples of the cyclic hydroxycarboxylates include γ-butyrolactone, δ-valerolactone and ε-caprolactone. These can be used singly or in combination of two or more. Of them, γ-butyrolactone and δ-valerolactone are particularly preferable.

Specific examples of the amine compounds containing one primary or secondary amino nitrogen include ethanolamine, diethanolamine, N-methylethanolamine, N-ethylethanolamine, N-phenylethanolamine, 2-amino-1-butanol, 2-amino-2-ethyl-1,3-propanediol, 6-amino-1-hexanol, 1,4-diaminobutane, 1,2-diaminocyclohexane and 1,10-diaminodecane. These can be used singly or in combination of two or more. Of them, ethanolamine, diethanolamine and N-methylethanolamine are particularly preferable from the standpoint of cost.

The reaction of a cyclic hydroxycarboxylate with ammonia or compound containing one primary or secondary amino nitrogen is conducted, for example, by mixing them in equimolar amounts and heating them at about 100° C. for 6 to 24 hours.

As the particularly preferable component (a1), N-methyl-N-(2-hydroxyethyl)-3-hydroxypropylamide and the like are listed.

The component (a2) is a poly-hydric alcohol compounds excluding the components (a1) described in detail above, and has an action to improve the flexibility and elongation of a cured substance of a urethane (meth)acrylate compound (A).

As the component (a2), for example, commercially available various poly-hydric alcohol compounds can be used. Specific examples thereof include polyether diols such as polyethylene glycol, polypropylene glycol, polybutylene glycol and 1-methylbutylene glycol; poly-hydric alcohols such as neopentyl glycol, ethylene glycol, diethylene glycol, propylene glycol, 1,6-hexanediol, 1,4-butanediol, 1,9-nonanediol, 1,10-decanediol, 3-methylpentanediol, 2,4-diethylpentanediol, tricyclodecanedimethanol, 1,4-cyclohexanedimethanol, 1,2-cyclohexanedimethanol, 1,3-cyclohexanedimethanol, cyclohexanediol, hydrogenated bisphenol A and bisphenol; polyether-modified diols obtained by adding alkylene oxides such as ethylene oxide, propylene oxide and butylenes oxide to the above-mentioned poly-hydric alcohols; polyester diols such as diol compounds obtained by reaction of the above-mentioned poly-hydric alcohols with poly-basic acids such as succinic acid, phthalic acid, hexahydrophthalic acid, terephthalic acid, adipic acid, azelaic acid and tetrahydrophthalic acid or acid anhydrides of these poly-basic acids, polycaprolactonediol compounds obtained by reaction of the above-mentioned poly-hydric alcohols with lactones such as ε-caprolactone, γ-butyrolactone, γ-valerolactone and δ-valerolactone, further, caprolactone-modified polyester diol compounds obtained by reaction of the above-mentioned poly-hydric alcohols and poly-basic acids with lactones such as ε-caprolactone, γ-butyrolactone, γ-valerolactone and δ-valerolactone; polycarbonate diols such as aromatic polycarbonate diol and aliphatic polycarbonate diol; polybutadienediols; and other compounds. These can be used singly or in combination of two or more.

In view of the low shrinkage property of the resulting cured substance, the weigh-average molecular weight of the component (a2) is preferably 300 or more. From the standpoint of decreasing in the viscosity of the composition, the weigh-average molecular weight is preferably 2000 or less. Further, it is particularly preferable to use at least one diol compound selected from the group consisting of polyether diols, polyester diols and polycarbonate diols, among the above-mentioned specific examples, from the standpoint of excellent strength elongation balance. Particularly preferable are polybutylene glycol, polycaprolactone diol and aliphatic polycarbonate diols.

The component (a3) is a diisocyanate compound. This component (a3) is a component not only introducing a urethane bond into the above-mentioned two alcohol components [components (a1) and (a2)] to increase toughness but also manifesting a urethane (meth)acrylate synthesis reaction for adding a hydroxy group-containing (meth)acrylate [component (a4)].

Specific examples of the component (a3) include isophorone diisocyanate, bis(4-isocyanatocyclohexyl)methane, bis(4-isocyanatophenyl)methane, bis(3-chloro-4-isocyanatophenyl)methane, 2,4-tolylene diisocyanate, 2,6-tolylene diisocyanate, 1,2-xylylene diisocyanate, 1,4-xylylene diisocyanate, 1,2-hydrogenated xylylene diisocyanate, 1,4-hydrogenated xylylene diisocyanate, tetramethylxylylene diisocyanate, hydrogenated tetramethylxylylene diisocyanate, naphthalene diisocyanate, hexamethylene diisocyanate and norbornane diisocyanate. These can be used singly or in combination of two or more.

Of them, preferable are isophorone diisocyanate, bis(4-isocyanatocyclohexyl)methane, 2,4-tolylene diisocyanate, 2,6-tolylene diisocyanate, 1,2-xylylene diisocyanate, 1,4-xylylene diisocyanate, 1,2-hydrogenated xylylene diisocyanate, 1,4-hydrogenated xylylene diisocyanate, hydrogenated tetramethylxylylene diisocyanate and norbornane diisocyanate.

Further, diisocyanate compounds having an alicyclic skeleton are particularly preferable such as isophorone diisocyanate, bis(4-isocyanatocyclohexyl)methane, 1,2-hydrogenated xylylene diisocyanate, 1,4-hydrogenated xylylene diisocyanate, hydrogenated tetramethylxylylene diisocyanate and norbornane diisocyanate, since they can impart excellent toughness and non yellowing property to a cured coating layer. It is preferable to use a diisocyanate compound having a hydrolysable chlorine amount of 100 ppm or less from the standpoint of improvement in an ability of protecting a recording layer of an optical disc.

The component (a4) is a hydroxy group-containing (meth)acrylate, and is a component imparting radical reactivity by addition thereof to the end of a polyurethane precursor. Specific examples thereof include 2-hydroxyethyl (meth)acrylate, 2-hydroxypropyl (meth)acrylate, 4-hydroxybutyl (meth)acrylate, 6-hydroxyhexyl (meth)acrylate, cyclohexane dimethanol mono(meth)acrylate, adduct of 2-hydroxyethyl (meth)acrylate and caprolactone, trimethylolpropane diacrylate, pentaerythritol triacrylate and dipentaerythritol pentaacrylate. These can be used singly or in combination of two or more. Of them, particularly preferable are 2-hydroxyethyl (meth)acrylate, 2-hydroxypropyl (meth)acrylate and 4-hydroxybutyl (meth)acrylate from the standpoint of decreasing in the viscosity of a composition.

The specific method of synthesizing a urethane (meth)acrylate compound (A) is not particularly restricted and various synthesis methods conventionally known can be used. For example, 0.8 to 1.2 mol equivalent of a mixture of a component (a1) and a component (a2), and di-n-butyltin dilaurate acting as a synthesis catalyst in an amount of 50 to 300 ppm based on the final total amount, are charged in a synthesis vessel, these are heated at 40 to 80° C., and 2 mol equivalent of diisocyanate, component (a3) is added while stirring, to obtain an isocyanate-ended polyurethane as a precursor. To this, 0.8 to 1.2 mol equivalent of a component (a4) is further dropped, and kept at 60 to 80° C. for 4 to 8 hours, to obtain a urethane (meth)acrylate compound (A).

The molar equivalent referred to here is a number obtained by multiplying the molar number of a compound used by the number of functional groups relating to the above-mentioned synthesis reaction.

In the composition of the present invention, the use proportion of a component (A) is not particularly restricted, and preferably from 20 to 80 parts by weight, more preferably from 25 to 75 parts by weight and particularly preferably from 30 to 70 parts by weight based on 100 parts by weight of the total amount of components (A) and (B). Particularly, the use proportion of a component (A) is preferably 15 parts by weight or more from the standpoint of the low shrinkage property of a composition, and preferably 75 parts by weight or less for decreasing the viscosity of a composition to obtain excellent workability of painting on an optical disc.

The component (B) used in the composition of the present invention is an ethylenically unsaturated compound other than the component (A), and is a component controlling the composition to have viscosity suitable for painting, further, improving a curing property and the durability of a cured coating layer.

This component (B) is not particularly restricted, and conventionally known various ethylenically unsaturated compounds can be used singly or in combination of two or more. Of them, bisphenol type epoxy (meth)acrylate compounds (b1) and/or compounds (b2) of the following generation formula (I) are preferably used.

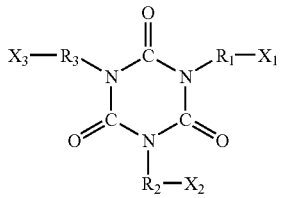

(I)

wherein, $X_1$ and $X_2$ represent an acryloyloxy group or methacryloyloxy group, $X_3$ represents a hydroxy group, acryloyloxy group or methacryloyloxy group, and $R_1$, $R_2$ and $R_3$ represent an alkyl group having 1 to 4 carbon atoms.

As the specific examples of the bisphenol type epoxy (meth)acrylate compound (b1), listed are bisphenol type epoxy (meth)acrylates obtained by reacting unsaturated mono-basic acids such as (meth)acrylic acid, (meth)acrylic acid dimmer and caprolactone-modified (meth)acrylic acid with a bisphenol type epoxy resin obtained by a condensation reaction of bisphenols such as bisphenol A, bisphenol F, bisphenol S and tetrabromobisphenol A with epichlorohydrin. Of them, preferable are bisphenol A type epoxy (meth)acrylate and bisphenol F type epoxy (meth)acrylate because of excellent balance of viscosity and heat resistance.

Since the resulting composition has low viscosity and shows low volume shrinkage coefficient in polymerization, bisphenol type epoxy (meth)acrylates having a molecular weight in the range from 800 to 5000 are more preferable. When the molecular weight is 800 or more, volume shrinkage coefficient in polymerization can be lowered to prevent skew of an optical disc. When 5000 or less, the viscosity of a composition can be lowered to improved painting workability.

For suppressing corrosion of a recording layer of an optical disc, it is preferable that an epoxy resin used as a raw material of an epoxy (meth)acrylate contains no chlorine. When chlorine is contained, the total chlorine content of an epoxy resin is preferably 2000 ppm or less, more preferably 1500 ppm or less.

Specific examples of the compound (b2) of the general formula (I) include bis(2-acryloyloxyethyl) hydroxyethyl isocyanurate, bis(2-acryloyloxypropyl) hydroxypropyl isocyanurate, bis(2-acryloyloxybutyl)-hydroxybutyl isocyanurate, bis(2-methacryloyloxyethyl) hydroxyethyl isocyanurate, bis(2-methacryloyloxypropyl) hydroxypropyl isocyanurate, bis(2-methacryloyloxybutyl) hydroxybutyl isocyanurate, tris(2-acryloyloxyethyl) isocyanurate, tris(2-acryloyloxypropyl) isocyanurate, tris(2-acryloyloxybutyl) isocyanurate, tris(2-methacryloyloxyethyl) isocyanurate, tris(2-methacryloyloxypropyl) isocyanurate and tris(2-methacryloyloxybutyl) isocyanurate. These can be used singly or in combination of two or more. Of them, tris(2-acryloyloxyethyl) isocyanurate showing an excellent curing property is preferably used, and it is more preferable to use a mixture obtained by mixing bis(2-acryloyloxyethyl) hydroxyethyl isocyanurate in an amount of 0.01 to 40% by weight with tris(2-acryloyloxyethyl) isocyanurate, from the standpoint low temperature storage stability.

Specific examples of the ethylenically unsaturated compound (B) other than the above-mentioned components (b1) and (b2) include poly-functional (meth)acrylates such as trimethylolpropane tri(meth)acrylate, trisethoxylated trimethylolpropane tri(meth)acrylate, ditrimethylolpropane tetra(meth)acrylate, pentaerythritol tri-(meth)acrylate, pentaerythritol tetra(meth)acrylate, ethoxylated pentaerithritol tri(meth)acrylate, ethoxylated pentaerytirhtol tetra(meth)acrylate, dipentaerythritol penta(meth)acrylate, dipentaerythritol penta(meth)acrylate, dipentaerythritol hexa(meth)acrylate, caprolactone-modified dipentaerythritol penta(meth)acrylate, caprolactone-modified dipentaerythritol hexa(meth)acrylate, $C_{2-5}$ aliphatic hydrocarbon-modified trimethylolpropane tria-crylate, $C_{2-5}$ aliphatic hydrocarbon-modified dipentaerythritol penta(meth)acrylate and $C_{2-5}$ aliphatic hydrocarbon-modified dipentaerythritol tetra(meth)acrylate;

di(meth)acrylates such as ethylene glycol di(meth)-acrylate, 1,3-butylene glycol di(meth)acrylate, 1,4-butanediol di(meth)acrylate, 1,6-hexanediol di(meth)acrylate, nonanediol di(meth)acrylate, neopentyl glycol di-(meth)acrylate, methylpentanediol di(meth)acrylate, diethylpentanediol di(meth)acrylate, neopentyl glycol hydroxypivalate di(meth)acrylate, tetraethylene glycol di(meth)acrylate, tripropylene glycol di(meth)acrylate, polybutylene glycol di(meth)acrylate, tricyclodecanedimethanol di(meth)acrylate, cyclohexanedimethanol di-(meth)acrylate, polyethoxylated cyclohexanedimethanol di(meth)acrylate, polypropoxylated cyclohexanedimethanol di(meth)acrylate, polyethoxylated bisphenol A di(meth)acrylate, polypropoxylated bisphenol A di(meth)acrylate, hydrogenated bisphenol A di(meth)acrylate, polyethoxylated hydrogenated bisphenol A di(meth)acrylate, polypropoxylated hydrogenated bisphenol A di(meth)acrylate, bisphenoxyfluorene ethanol di(meth)acrylate, neopentyl glycol-modified. trimethylolpropane di(meth)acrylate, di(meth)acrylate of ε-caprolactone adduct (n+m=2 to 5) of neopentyl glycol hydroxypivalate, di(meth)acrylate of γ-butyrolactone adduct (n+m=2 to 5) of neopentyl glycol hydroxypivalate, di(meth)acrylate of caprolactone adduct (n+m=2 to 5) of neopentyl glycol, di(meth)acrylate of caprolactone adduct (n+m=2 to 5) of butylene glycol, di(meth)acrylate of caprolactone adduct (n+m=2 to 5) of cyclohexanedimethanol, di(meth)acrylate of caprolactone. adduct (n+m 2 to 5) of dicyclopentanediol, di(meth)acrylate of caprolactone adduct (n+m=2 to 5) of bisphenol A, di(meth)acrylate of caprolactone adduct (n+m=2 to 5) of hydrogenated bisphenol A and di(meth)acrylate of caprolactone adduct (n+m=2 to 5) of bisphenol F;

(meth)acrylates such as 2-hydroxyethyl (meth)acrylate, 2-hydroxypropyl (meth)acrylate, 4-hydroxybutyl (meth)acrylate, tetrahydrofurfuryl (meth)acrylate, phenoxyethyl (meth)acrylate, cyclohexyl (meth)acrylate, isobonyl (meth)acrylate, norbornyl (meth)acrylate, 2-methyl-2-norbornylmethyl (meth)acrylate, trimethyloipropaneformal (meth)acrylate, 2-methyl-2-ethyl-1,3-dioxolanyl (meth)acrylate, adamantyl (meth)acrylate, benzyl (meth)acrylate, phenyl (meth)acrylate, dicyclopentenyl (meth)acrylate, dicyclopentenyl (meth)acrylate, tetracyclododecanyl (meth)acrylate, cyclohexanedimethanol mono(meth)acrylate, 2-methoxyethyl (meth)acrylate, 3-methoxybutyl (meth)acrylate, methoxytriethylene glycol (meth)acrylate, butoxyethyl (meth)acrylate and methoxydipropylene glycol (meth)acrylate;

vinyl ester monomers such as vinyl acetate, vinyl butyrate, N-vinylformamide, N-vinylacetamide, N-vinyl-2-pyrrolidone, N-vinylcaprolactam and divinyl adipate;

vinyl ethers such as ethyl vinyl ether and phenyl vinyl ether;

acrylamides such as acrylamide, N,N-dimethylacrylamide, N,N-dimethylmethacrylamide, N-methylolacrylamide, N-methoxymethylacrylamide, N-butoxymethylacrylamide, N-t-butylacrylamide, acryloylmorpholine, hydroxyethylacrylamide and methylenebisacrylamide;

polyester poly(meth)acrylates obtained by reaction of a poly-basic acid such as phthalic acid, succinic acid, hexahydrophthalic acid, tetrahydrophthalic acid, terephthalic acid, azelaic acid and adipic acid with a poly-hydric alcohol such as ethylene glycol, hexanediol, polyethylene glycol and polytetramethylene glycol, and (meth)acrylic acid or its derivative;

urethane poly(meth)acrylates other than the components (A), obtained by reacting a single body or a mixture of two or more of organic diisocyanate compounds with a single body or a mixture of two or more of hydroxyl group-containing (meth)acrylates having one or more (meth)acryloyloxy groups and one hydroxyl group in the molecule;

urethane poly(meth)acrylates other than the components (A), obtained by adding an organic diisocyanate compound to a hydroxyl group of one of alkane diols, polyether diols, polybutadiene diol, polyester diols, polycarbonate diols and spiroglycol compounds or of alcohols composed of a mixture of two or more of them, and reacting a hydroxyl group-containing (meth)acrylate containing one or more (meth)acryloyloxy groups and one hydroxyl group in the molecule with the remaining isocyanate groups.

These can be used singly or in combination of two or more. Of them, compounds having a cyclic structure in the molecule are preferable because of excellent water resistance. Specific examples of these preferable compounds include compounds such as tricyclodecanedimethanol di(meth)acrylate, polyethoxylated bisphenol A di(meth)acrylate, polypropoxylated bisphenol A di(meth)acrylate, polyethoxylated hydrogenated bisphenol A di(meth)acrylate, polypropoxylated hydrogenated bisphenol A di(meth)acrylate, polyethoxylated cyclohexanedimethanol di(meth)acrylate, polypropoxylated cyclohexanedimethanol di(meth)acrylate, tetrahydrofurfuryl (meth)acrylate, phenoxyethyl (meth)acrylate, cyclohexyl (meth)acrylate, isobonyl (meth)acrylate, norbomyl (meth)acrylate, 2-methyl-2-norbomylmethyl (meth)acrylate, trimethyloipropaneformal (meth)acrylate, 2-methyl-2-ethyl-1,3-dioxolanylmethyl (meth)acrylate, adamantyl (meth)acrylate, benzyl (meth)acrylate, phenyl (meth)acrylate, dicyclopentenyl (meth)acrylate, dicyclopentenyl (meth)acrylate and tetracyclododecanyl (meth)acrylate.

In the composition of the present invention, the use ratio of the component (B) is not particularly restricted, and preferably from 20 to 80 parts by weight, more preferably from 25 to 75 parts by weight based on 100 parts by weight of the total amount of the components (A) and (B). Particularly, the use ratio of the component (B) is preferably 20 parts by weight or more for decreasing the viscosity of a composition and for enhancing painting workability on an optical disc, and preferably 80 parts by weight or less from the standpoint of the low shrinkage property of a composition.

When the component (B) contains the above-mentioned component (b1) and/or the component (b2), the total use ratio of the components (b1) and (b2) is preferably from 5 to 40 parts by weight, more preferably from 5 to 30 parts by weight based on 100 parts by weight of the total amount of the components (A) and (B). When this use ratio is 5 parts by weight or more, the mechanical strength of a cured coating layer tends to become excellent, and when 40 parts by weight or less, there is a tendency that the liquid viscosity of a composition decreases and painting workability on an optical disc is improved.

The component (C) used in the composition of the present invention is a photopolymerization initiator, and by inclusion of this, a cured substance can be efficiently obtained by a ultraviolet ray curing method.

Specific examples of the component (C) include benzophenone, 4,4-bis(diethylamino)benzophenone, 2,4,6-trimethylbenzophenone, methyl-o-benzoyl benzoate, 4-phenylbenzophenone, t-butylanthraquinone, 2-ethylanthraquinone, diethoxyacetophenone, 2-hydroxy-2-methyl-1-phenylpropan-1-one, benzyldimethylketanol, 1-hydroxycyclohexyl-phenylketone, benzoin methyl ether, benzoin ethyl-ether, benzoin isopropyl ether, benzoin isobutyl ether, 2-methyl-[4-(methylthio)phenyl]-2-morpholino-1-propanone, 2-benzyl-2-dimethylamino-1-(4-morpholinophenyl)-butanone-1, diethylthioxanetone, isopropylthioxanetone, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)-phenylphosphine oxide and methylbenzoyl formate.

For example, when the wavelength of laser used for reading of an optical disc is in the range from 380 to 800 nm, it is preferable to appropriately select the kind and use amount of a photopolymerization initiator so that laser ray necessary for reading can pass a cured coating layer sufficiently. In this case, it is particularly preferable to use a short wavelength-photosensitive type photopolymerization initiator so that a cured coating layer does not absorb blue laser ray.

Specific examples of this short wavelength-photo-sensitive type photopolymerization initiator include benzophenone, 2,4,6-trimethylbenzophenone, methyl-o-benzoyl benzoate, 4-phenylbenzophenone, diethoxyacetophenone, 2-hydroxy-2-methyl-1-phenylpropan-1-one, benzyl dimethyl ketal, 1-hydroxycyclohexyl-phenylketone, benzoin methyl ether, benzoin ethyl ether, benzoin isopropyl ether, benzoin isobutyl ether and, methyl benzoyl formate. These can be used singly or in combination of two or more.

In the composition of the present invention, the use ratio of the component (C) is not particularly restricted, and preferably from 0.001 to 10 parts by weight, more preferably from 0.01 to 5 parts by weight based on 100 parts by weight of the total amount of the components (A) and (B). Particularly, the use ratio of the component (C) is preferably 0.001 part by weight or more from the standpoint of the curing property of a coated film, and preferably 10 parts by weight or less from the standpoints of the deep part curing property of a coated film, prevention of coloration of a cured substance, and reading of information of a recording layer by blue laser.

Further, in the composition of the present invention, conventionally known various photo-sensitizers can also be added, if necessary, such as methyl 4-dimethylaminobenzoate, ethyl 4-dimethylaminobenzoate, amyl 4-dimethylaminobenzoate and 4-dimethylaminoacetophenone. Further, if necessary, conventionally known various additives may also be compounded, such as thermoplastic polymers, slipping agents, leveling agents, antioxidants, photo-stabilizers, ultraviolet absorbers, polymerization inhibitors, silane coupling agents, inorganic fillers, organic fillers and inorganic fillers having an organic-treated surface, in an amount not deteriorating its abilities.

Particularly, it is preferable to use an antioxidant or photo-stabilizer, to prevent yellowing of a cured film in use for a long period of time and to avoid disturbance in reading or writing of an optical disc.

As the antioxidant or photo-stabilizer, those commercially available can be used. Specific examples of the commercially available products include products of Sumitomo Chemical Co., Ltd., Sumilizer BHT, Sumilizer S, Sumilizer BP-76, Sumilizer MDP-S, Sumilizer GM, Sumilizer BBM-S, Sumilizer WX-R, Sumilizer NW, Sumilizer BP-179, Sumilizer BP-101, Sumilizer GA-80, Sumilizer TNP, Sumilizer TPP-R, Sumilizer P-16; products of Asahi Denka Kogyo K.K., Adekastab AO-20, Adekastab AO-30, Adekastab AO-40, Adekastab AO-50, Adekastab AO-60AO-70, Adekastab AO-80, Adekastab AO-330, Adekastab PEP-4C, Adekastab PEP-8, Adekastab PEP-24G, Adekastab PEP-36, Adekastab HP-10, Adekastab 2112, Adekastab 260, Adekastab 522A, Adekastab 329K, Adekastab 1500, Adekastab C, Adekastab 135A, Adekastab 3010; products of Chiba Specialty Chemicals K.K., Tinubin 770, Tinubin 765, Tinubin 144, Tinubin 622, Tinubin 111, Tinubin 123, Tibubin 292; products by Hitachi Chemical Co., Ltd., Fancryl FA-711M, FA-712 HM and the like (these are all trade names).

The addition amount these antioxidants and photostabilizers is not particularly restricted, and preferably from 0.001 to 2 parts by weight, more preferably from 0.01 to 1 part by weight based on 100 parts by weight of the total amount of the components (A) and (B).

The viscosity of the composition of the present invention is preferably from 1000 to 10000 mPa·s at 25° C., and more preferably from 2000 to 8000 mPa·s. When this viscosity is 1000 mPa·s or more, painting workability is excellent, and when 10000 mPa·s or less, handing of a composition is excellent. When in the range from 2000 to 8000 mPa·s, a coated layer having a thickness of 100 μm can be obtained by spin-coating in a short period of time.

The painting method of the composition of the present invention is not particularly restricted, and may advantageously be conducted by known methods, and preferable is a spin coater method from the standpoint of the productivity of an optical disc.

For curing a coated film of the composition of the present invention, the membrane may be advantageously irradiated with active energy rays such as, for example, $\alpha$, $\beta$ and $\gamma$ rays by a known method. Particularly, ultraviolet ray is preferably used. The ultraviolet ray generation source may be a ultraviolet ray lamp generally used from the standpoints of practicability and economy. Specific examples of the ultraviolet lamp include a low pressure mercury lamp, high pressure mercury lamp, super high pressure mercury lamp, xenon lamp and metal halide lamp. Irradiation with light energy may be conducted in air or in an inert gas such as nitrogen and argon.

Next, the optical disc of the present invention will be illustrated in detail.

The optical disc of the invention relates to an optical disc having a cured coating layer obtained by curing the active energy ray curable composition of the present invention described above; or an optical disc comprising a substrate carrying thereon a recording layer and a cured coating layer laminated in this order in which the cured coating layer acts as an incident side surface for recording light and/or reading light, wherein the cured coating layer is a layer obtained by curing a curable composition having a volume shrinkage coefficient of 7.5% or less, having a pencil hardness of 2B or more, and having a beam transmittance in the wavelength range. from 380 to 800 nm of 75% or more.

The cured coating layer herein referred indicates all cured coating layers constituting optical discs, such as an optical transmittance layer of an optical disc, an adhesive and optical transmittance layer of multi-layer recording type discs such as DVD. This cured coating layer is preferably apparently transparent so that reading disturbance does not occur when reading and writing of data of a recording layer are conducted.

The active energy ray curable composition having a volume-shrinkage coefficient of 7.5% or less forming this cured coating layer is not particularly restricted and listed are, for example, compositions of the present invention as described in detail above.

In the present invention, liquid specific gravity (d1) before curing at 20° C. and specific gravity (d2) at 20° C. of a cured coating layer obtained by curing are measured, and a value calculated according to the following numerical formula is volume shrinkage coefficient (%).

$$\text{Volume shrinkage coefficient (\%)} = [(d2-d1)/d2] \times 100 \quad (1)$$

When the volume shrinkage coefficient is over 7.5%, disadvantages easily occur such as poor close adhesiveness with a recording layer and significant skew of an optical disc by shrinkage in curing, causing a tendency of difficulty in recording and reading.

The surface hardness of a cured coating layer of an optical disc of the present invention is preferably 2B or more in terms of pencil hardness. Particularly, when a hard coat layer is not formed on a cured coating layer, the hardness is more preferably B or more. The pencil hardness herein referred to is a value obtained by a method according to JIS K-5400. When this pencil hardness is softer than 2B, the surface of a cured coating layer is easily scratched, leading to a tendency to cause writing or reading error of an optical disc.

The beam transmittance of a cured coating layer of the optical disc of the present invention in the wavelength range of 380 to 800 nm is preferably 75% or more, more preferably 80% or more, for preventing reading or writing error. The wavelength of laser ray used for reading or writing of the optical disc of the present invention is not particularly restricted, and in general, it is used for reading or writing of an optical disc. Laser ray within the wavelength range from 380 to 800 nm is preferable, and violet laser ray having a wavelength around 400 nm is preferable particularly since the recording capacity of an optical disc can be increased.

The thickness of a cured coating layer is not particularly restricted providing desired properties are obtained, and preferably from 20 to 200 μm, more preferably from 50 to 150 μm. When this thickness is 20 μm or more, oxidation deterioration or deterioration by water of a recording layer can be suppressed. When 200 μm or less, skew of an optical disc can be suppressed.

For forming a cured coating layer, it may be recommendable that, for example, a uniform painted membrane of an active energy ray curable composition is formed on the recording layer side of a supporting substrate having a recording layer, and the membrane is irradiated with active energy ray for curing.

The glass transition temperature of a cured coating layer is not particularly restricted, and preferably 50° C. or more, more preferably 60° C. or more, in view of use in environments requiring heat resistance such as automobile application.

On the optical disc of the present invention, a hard coat layer and the like may be appropriately laminated on a cured coating layer, for the purpose of further improving weather resistance and surface hardness.

The composition for forming a hard coat layer is not particularly restricted, and conventionally known various hard coat compositions can be used such as, for example, acrylic hard coat materials and silica fine particle-containing hard coat materials. It is preferable that this composition is painted and cured to form a hard coat layer having a thickness of 0.1 to 7 μm, preferably 0.3 to 5 μm. In this case, the beam transmittance in the wavelength range from 380 to 800 nm through two layers of a cured coating layer and a hard coat layer is preferably 70% or more, more preferably 75% or more.

As the specific examples of the acrylic hard coat material, mentioned are hard coat compositions composed of 20 to 60% by weight of a compound having three or more (meth)acryloyl groups in the molecule and 40 to 80% by weight of other ethylenically unsaturated compounds.

Particularly, when a high density optical disc which shows increase in reading error only in the presence of slight scratch is produced, it is preferable to use silica fine particle-containing hard coat materials. Namely, it is preferable that, on a cured coating layer of an optical disc, colloidal silica fine particles (d1) and a hydrolysis product of an organic silane compound (d2) are condensed to obtain a curable composition containing organic-coated silica (D) which is cured to form a hard coat layer. It is more preferable that a curable composition containing this organic-coated silica (D) and ethylenically unsaturated compound (E) is cured, to form a hard coat layer. The organic-coated silica (D) is a component imparting abrasion resistance and durability to a hard coat layer.

The colloidal silica fine particle (d1) is not particularly restricted, and for example, there can be used those prepared by dispersing ultra fine particles of inorganic silic acid having primary particle size of 1 to 200 nm, preferably 5 to 80 nm in water or an organic solvent. When the primary particle size is 1 nm or more, there is a tendency that gelling is not cause in reacting with the component (d2), and when 200 nm or less, there is a tendency that the transparency of a hard coat layer becomes excellent.

The organic silane compound used in the hydrolysis product (d2) of an organic silane compound is not particularly restricted, and conventionally known various organic silane compounds can be used. Specific examples thereof include methyltrimethoxysilane, dimethyldimethoxysilane, phenyltrimethoxysilane, diphenyldimethoxysilane, methyltriethoxysilane, dimethyldiethoxysilane, phenyltriehtoxysilane, diphenyldiethoxysilane, styryltrimethoxysilane, styryltriethoxysilane, hexyltrimethoxysilane, decyltrimethoxysilane, vinyltris(3-methoxyethoxy)silane, vinyltriethoxysilane, vinyltrimethoxysilane, 3-methacryloyloxypropyltrimethoxysilane, 3-acryloyloxypropyltrimethoxysilane, 3-methacryloyloxypropyltriethoxysilane, O-(3,4-epoxycyclohexyl)ethyltrimethoxysilane, 3-glycidoxypropyltrimethoxysilane, 3-glycidoxypropylmethyldiethoxysilane, 3-methacryloyloxypropylmethyldiethoxysilane, N-β(aminoethyl)γ-aminopropyltrimethoxysilane, N-β(aminoethyl)γ-aminopropylmethyldimethoxysilane, 3-aminopropyltriethoxysilane, N-phenyl-γ-aminopropyltrimethoxysilane, 3-mercaptopropyltrimethoxysilane, 3-chloropropyltrimethoxysilane and 3-isocyanatopropyltriethoxysilane. These can be used singly or in combination of two or more.

Further, silane compounds obtained by adding (meth)acrylic acid to an epoxy group or glycidyl group of these compounds, silane compounds obtained by Michael-adding a compound having two (meth)acryloyloxy groups to an amino group of these compounds, silane compounds-obtained by adding a compound having a (meth)acryloyloxy group and an isocyanate group to an amino group or mercapto group of these compounds, silane compounds obtained by adding a compound having a (meth)acryloyloxy group and a hydroxyl group to an isocyanate group of these compounds can also be used.

As the organic silane compound used in this hydrolysis product (d2), most preferable are monomers (organic silane compounds) of the following general formula (II):

wherein, X represents a methacryloyloxy group, acryloyloxy group, styryl group or vinyl group, $R_4$ represents a direct bond or a linear or branched alkyl group having 1 to 8 carbon atoms, $R_5$ and $R_6$ represent a linear or branched alkyl group having 1 to 8 carbon atoms, a represents an integer of 1 to 3, b represents an integer of 0 to 2, and a+b represents an integer of 1 to 3.

When a monomer of the general formula (II) is hydrolyzed to give a silanol compound, and the silanol compound is condensed with colloidal silica fine particles (d1), organic-coated silica (D) is obtained. The organic-coated silica (D) obtained by using a monomer of the general formula (II) shows a photo-curing property enabling formation of a chemical bond with an ethylenically unsaturated compound (E). Namely, by use of a monomer of the general formula (II), compatibility of the component (D) and the component (E) is improved, and toughness can be imparted to the resulting cured coating layer.

Specific examples of the monomer of the general formula (II) include 3-methacryloyloxypropyltrimethoxysilane, 3-acryloyloxypropyltrimethoxysilane, 2-methacryloyloxyethyltrimethoxysilane, 2-acryloyloxyethyltrimethoxysilane, 3-methacryloyloxypropyltriethoxysilane, 3-acryloyloxypropyltriethoxysilane, 2-methacryloyloxyethyltriethoxysilane, 2-acryloyloxyethyltriethoxysilane, 3-methacryloyloxypropylmethyldimethoxysilane, 3-acryloyloxypropylmethyldimethoxysilane, styryltrimethoxysilane, styryltriethoxysilane and vinyltrimethoxysilane, vinyltriethoxysilane. These can be used singly or in combination of two or more. Of them, 3-methacryloyloxypropylmethoxyilane, 3-acryloyloxypropyltrimethoxysilane, 3-methacryloyloxypropyltriethoxysilane, 3-acryloyloxyropylrithoxysilane, vinyltrimethoxysilane and vinyltriethoxysilane are particularly preferable in excellent reactivity with the component (E).

The organic-coated silica (D) can be produced by, for example, in the presence of colloidal silica fine particles (d1) and a hydrolysis product (d2) of an organic silane compound, azeotropically distilling a dispersion medium of the colloidal silica fine particles (d1) together with a non-polar solvent such as toluene under normal pressure or reduced pressure to substitute the dispersion medium by a non-polar solvent, then, heating them to cause reaction. The term "in the presence of colloidal silica fine particles (d1) and a hydrolysis product (d2) of an organic silane compound" herein referred to means a condition obtained by the following two methods (1) and (2) when the hydrolysis product (d2) of an organic silane compound is a silanol compound obtained by hydrolysis of a monomer of the general formula (II).

(1) A method in which the component (d1) and a monomer of the general formula (II) are mixed, and a hydrolysis catalyst is added to this, and hydrolysis is caused by normal methods such as stirring under normal temperature or heating, and the like, to provide coexistence of the component (d1) and the component (d2).

(2) A method in which the component (d2) previously obtained by hydrolysis of a monomer of the general formula (II), and the component (d1) are mixed, to cause coexistence.

Further, to the product obtained by the above-mentioned methods (1) and (2), 0.5 to 6 mol of water of 0.001 to 0.1 N hydrochloric acid or a hydrolysis catalyst such as an acetic acid aqueous solution is added, per mol of a monomer of the general formula (I), in the presence or absence of an organic solvent such as an alcohol solvent (in the case of the above-mentioned method (1), the component (d1) is also present), and the mixture is stirred under heat while removing an alcohol generated by hydrolysis out of the system. Thus, a hydrolysis product (d2) can be produced.

Next, a condensation reaction of the component (d1) and the component (d2) is conducted, to obtained organic-coated silica (D). Specifically, in the presence of the resulted component (d2) in the method (1), and the component (d2) is added in the method (2), for example, and first, water-generated in a condensation reaction with a dispersion medium in the colloidal silica fine particles (d1) is azeotropically distilled under normal pressure or reduce pressure at a temperature of 60 to 100° C., preferably 70 to 90° C., to give a solid concentration from 50 to 90% by weight. Next, a non-polar solvent such as toluene is added into the system, and a condensation reaction is conducted by stirring for 0.5 to 10 hours while maintaining a solid concentration from 30 to 90% by weight, preferably from 50 to 80% by weight at a temperature of 60 to 150° C., preferably 80 to 130° C., while azeotropically distilling this non-polar solvent, water and a dispersion medium of colloidal silica fine particles. In this procedure, a catalyst such as water, acid, base and salt may be used for the purpose of promoting the reaction.

By use of the organic-coated silica (D) obtained by coating the surface of the hydrophilic colloidal silica fine particle obtained as described above with silicone for hydrophobization, in a curable composition (silica fine particle-containing hard coat material) for forming a hard coat layer, compatibility with an ethylenically unsaturated compound (E) contained in the composition is improved, and a cured coated layer excellent in transparency is obtained.

As the specific example of the ethylenically unsaturated compound (E), the same compounds as for the above-mentioned components (A) and (B) are listed of them, particularly preferable are dipentaerythritol pentameth)crylate, dipentaerythritol hexa(meth)acrylate, pentaerythritol tri(meth)acrylate, pentaerythritol tetra(meth)acrylate, tris(2-(meth)acryloyloxyethyl) isocyanurate, bis(2-(meth)acryloyloxyethyl) hydroxyethyl isocyanurate, trimethylolpropane tri(meth)acrylate, urethane tri(meth)acrylate obtained by reacting 2-hydroxyethyl (meth)acrylate with trimer of 1,6-hexamethylene diisocyanate, and urethane hexa(meth)acrylate obtained by reacting an organic diisocyanate and pentaerythritol tri(meth)acrylate.

Into a curable composition for forming a hard coat layer (hereinafter, referred to as "hard coat layer curable composition"), it is preferable to add a photopolymerization initiator, for efficient curing with active energy ray. As the specific examples thereof, the same compounds as those described above for the component (C) are listed. Of them, preferable are benzophenone, diethoxyacetophenone, 2-hydroxy-2-methyl-1-phenyipropan-1-one, benzyl dimethyl ketal, 1-hydroxycyclohexyl-1-phenylketone, benzoin methyl ether, benzoin ethyl ether, benzoin isopropyl ether, benzoin isobutyl ether, 4,4-bis(diethylamino)benzophenone, 2,4,6-trimethylbenzophene, methyl-o-benzoyl benzoate, 4-phenylbenzophenone, thioxanetone, diethyithioxanetone, isopropyithioxanetone, chlorothioxanetone, t-butylanthraquinone, 2-ethylanthraquinone, 2-methyl-1-[4-(methylthio)phenyl]-2-morpholinopropan-1-one and thiobenzoyl formate.

Further, to the hard coat layer curable composition, conventionally known various photo-sensitizers may be added such as methyl 4-dimethylaminobenzoate, ethyl 4-dimethylaminobenzoate, amyl 4-dimethylaminobenzoate and 4-dimethylaminoacetophenone, if necessary. Further, if necessary, various additives may be compounded such as organic solvents, antioxidants, yellowing preventing agents, blueing agents, pigments, leveling agents, defoaming agents, thickening agents, precipitation inhibiting agents, antistatic agents, fogging preventing agents, ultraviolet absorbers and photo-stabilizer.

For painting of the hard coat layer curable composition, it is preferable to compound an organic solvent from the standpoints of viscosity control, and close adherence with a dispersion stabilizer and substrate, smoothness and uniformity of a cured coated layer. The compounding amount of an organic solvent is not particularly restricted, and preferably from 30 to 2000 parts by weight, more preferably from 50 to 1000 parts by weight based on 100 parts by weight of the total amount of the components (D) and (E).

As the organic solvent, listed are, for example, alcohol-based, hydrocarbon-based, ketone-based, ether-based, ester-based, poly-hydric alcohol derivative-based, halogenated hydrocarbon-based organic solvents. More specifically listed are alcohol-based solvents such as isopropyl alcohol, n-butanol, isobutanol and diacetone alcohol; hydrocarbon-based solvents such as hexane, cyclohexane, toluene, xylene and aromatic solvents of high boiling point (Swazole 1000 and the like); ketone-based solvents such as methyl ethyl ketone (MEK), methyl isobutyl ketone (MIBK), diisobutyl ketone (DIBK) and cyclohexanone; ether-based solvents such as ethyl ether; ester-based solvents such as ethyl acetate, n-butyl acetate, amyl acetate, methoxypropyl acetate and ethoxyethyl acetate; poly-hydric alcohol derivative-based solvents such as methylcellosolve, ethylcellosolve, butylcellosolve, methoxypropanol, methoxypropyl acetate, methoxybutanol and ethyl diglycol; and so on. These may be used singly or in admixture of two or more.

Of them, methoxypropanol and methoxypropyl acetate are particularly preferable from the standpoints of the uniform solubility and dispersion stability of a hard coat layer curable composition, further, close adherence with a substrate and the smoothness and uniformity of a coated film. However, when these solvents are used, it is necessary to evaporate the solvent before conducting curing with active energy ray, after painting. The evaporation method is not particularly restricted, and heat treatment may be advantageously conducted at 20 to 120° C. for 1 to 60 minutes using known means such as natural drying, infrared drying and drying with a hot air furnace.

In the hard coat layer curable composition, a fluorine-based or silicone-based slipping agent may be added for enhancing the slipping property of an optical disc and improving a scratch-preventing ability. As the slipping agent, polyether-modified silicone is suitable.

A supporting substrate of the optical disc of the present invention may be transparent or opaque. As its material, known materials such as glass, ceramics, metals and plastics can be used. Of them, plastics are preferable from the standpoint of easiness in molding a land and groove of a cheap and light optical disc. Specific examples thereof include polycarbonate-based resins, polymethyl methacrylate-based resins and amorphous polyolefin-based resins. Namely, it is preferable to use a molded article of such plastic materials, as a supporting substrate.

A recording layer of the optical disc of the present invention is not particularly restricted, and conventionally known various materials for recording can be used. For example, in the case of a reading-dedicated optical disc, metals showing high light reflection coefficient can be used such as gold, silver, silver alloy, aluminum and aluminum alloy, as the material of a recording layer. Particularly, an aluminum alloy which is cheap and showing high durability is preferable. For example, in the case of a re-writable optical disc, listed as the material of a phase change recording layer are silver.In. Te.Sb alloy, silver.In.Te.Sb.Ge alloy, Ge.Sb.Te alloy, Ge.Sn.Sb.Te alloy and Sb.Te alloy, and listed as the material of a photomagnetic recording layer are Tb.Fe.Co alloy and the like. Further, a dielectric layer such as $SiN$, $ZnS$ and $SiO_2$ may be stacked on these recording layers.

For forming a recording layer, known thin film forming technologies such as a vacuum vapor deposition method, ion plating method and sputtering method may advantageously be used.

The present invention will be illustrated in detail below using examples. In the following descriptions, "parts" are by weight.

SYNTHESIS EXAMPLE 1

Production of Urethane Acrylate
(UA1: Component A)

(1) Into a three-necked flask having an internal volume of 5 liter equipped with a stirrer, thermoregulator, thermometer and condenser was charged 1112 g (10 mol equivalent) of isophorone diisocyanate (Desmodur I manufactured by Sumitomo Bayer Urethane K.K., hydrolyzable chlorine amount: 60 ppm) and 0.5 g of dibutyltin dilaurate, and heated so that the inner temperature reached 70° C. with a water bath.

(2) Liquid prepared by uniformly mixing and dissolving 193 g (2.4 mol equivalent) of N-methyl-N-(2-hydroxyethyl)-3-hydroxypropylamide and 1105 g (2.6 mol equivalent) of polybutylene glycol (n=12, average molecular weight: 850) was charged into a dropping funnel equipped with a side tube. The liquid in this dropping funnel was dropped at constant rate for 4 hours with heating the content in the flask of the above-mentioned operation (1) while maintaining the inner temperature of the flask at 65 to 75° C., and the content was stirred at the same temperature for 2 hours to cause reaction.

(3) Then, the temperature of the flask content was lowered to 60° C., and liquid prepared by uniformly mixing and dissolving 581 g (5 mol equivalent) of 2-hydroxyethyl acrylate and 1.5 g of hydroquinone monomethyl ether, charged in a separate dropping funnel, was dropped at constant rate for 2 hours while maintaining the inner temperature of the flask at 55 to 65° C. Then, they were reacted for 4 hours while maintaining the temperature of the flask content at 75 to 85° C., to obtain a urethane acrylate (UA1). Completion of the reaction was judged by measurement of the remaining isocyanate equivalent, to confirm that the reaction ratio was 99% or more.

SYNTHESIS EXAMPLE 2

Production of Urethane Acrylate
(UA2: Component A)

(1) Into a three-necked flask having an internal volume of 5 liter equipped with a stirrer, thermoregulator, thermometer and condenser was charged 1324 g (10 mol equivalent) of bis(4-isocyanatocyclohexyl)methane (Desmodur W manufactured by Sumitomo Bayer Urethane K.K., hydrolyzable chlorine amount: 4 ppm) and 0.5 g of dibutyltin dilaurate, and heated so that the inner temperature reached 70° C. with a water bath.

(2) Liquid prepared by uniformly mixing and dissolving 70 g (0.8 mol equivalent) of N-methyl-N-(2-hydroxyethyl)-4-hydroxybutylamide and 848 g (3.2 mol equivalent) of polycaprolactonediol (Placcel2o5 manufactured by Daicel Chemical Industries, Ltd., average molecular weight: 530) was charged into a dropping funnel equipped with a side tube. The liquid in this dropping funnel was dropped at constant rate for 4 hours with heating the content in the flask of the above-mentioned operation (1) while maintaining the inner temperature of the flask at 65 to 75° C., and the content was stirred at the same temperature for 2 hours to cause reaction.

(3) Then, the temperature of the flask content was lowered to 60° C., and liquid prepared by uniformly mixing and dissolving 696 g (6 mol equivalent) of 2-hydroxyethyl acrylate and 1.5 g of hydroquinone monomethyl ether, charged in a separate dropping funnel, was dropped at constant rate for 2 hours while maintaining the inner temperature of the flask at 55 to 65° C. Then, they were reacted for 4 hours while maintaining the temperature of the flask content at 75 to 85° C., to obtain a urethane acrylate (UA2). Completion of the reaction was judged by measurement of the remaining isocyanate equivalent, to confirm that the reaction ratio was 99% or more.

SYNTHESIS EXAMPLE 3

Production of Urethane Acrylate
(UA3: Component A)

(1) Into a three-necked flask having an internal volume of 5 liter equipped with a stirrer, thermoregulator, thermometer and condenser was charged 1112 g (10 mol equivalent) of isophorone diisocyanate and 0.5 g of dibutyltin dilaurate, and heated so that the inner temperature reached 70° C. with a water bath.

(2) Liquid prepared by uniformly mixing and dissolving 161 g (2 mol equivalent) of N-methyl-N-(2-hydroxyethyl)-3-hydroxypropylamide and 1303 g (2.6 mol equivalent) of aliphatic polycarbonatediol (CX-4710 manufactured by Asahi Chemical Industry Co., Ltd., average molecular weight: 1002) was charged into a dropping funnel equipped with a side tube. The liquid in this dropping funnel was dropped at constant rate for 4 hours with heating the content in the flask of the above-mentioned operation (1) while maintaining the inner temperature of the flask at 65 to 75° C., and the content was stirred at the same temperature for 2 hours to cause reaction.

(3) Then, the temperature of the flask content was lowered to 60° C., and liquid prepared by uniformly mixing and dissolving 626 g (5.4 mol equivalent) of 2-hydroxyethyl acrylate and 1.5 g of hydroquinone monomethyl ether, charged in a separate dropping funnel, was dropped at constant rate for 2 hours while maintaining the inner temperature of the flask at 55 to 65° C. Then, they were reacted for 4 hours while maintaining the temperature of the flask content at 75 to 85° C., to obtain a urethane acrylate (UA3). Completion of the reaction was judged by measurement of the remaining isocyanate equivalent, to confirm that the reaction ratio was 99% or more.

SYNTHESIS EXAMPLE 4

Production of Urethane Acrylate
(UA4: Component B)

(1) Into a three-necked flask having an internal volume of 5 liter equipped with a stirrer, thermoregulator, thermometer and condenser was charged 867 g (7.8 mol equivalent) of isophorone diisocyanate and 0.5 g of dibutyltin dilaurate, and heated so that the inner temperature reached 70° C. with a water bath.

(2) 1658 g (3.0 mol equivalent) of polybutylene glycol was charged into a dropping funnel equipped with a side tube. The liquid in this dropping funnel was dropped at constant rate for 4 hours with heating the content in the flask of the above-mentioned operation (1) while maintaining the inner temperature of the flask at 65 to 75° C., and the content was stirred at the same temperature for 2 hours to cause reaction.

(3) Then, the temperature of the flask content was lowered to 60° C., and liquid prepared by uniformly mixing and dissolving 453 g (3.9 mol equivalent) of 2-hydroxyethyl acrylate and 1.5 g of hydroquinone monomethyl ether, charged in a separate dropping funnel, was dropped at constant rate for 2 hours while maintaining the inner temperature of the flask at 55 to 65° C. Then, they were reacted for 4 hours while maintaining the temperature of the flask content at 75 to 85° C., to obtain a urethane acrylate (UA4). Completion of the reaction was judged by measurement of the remaining isocyanate equivalent, to confirm that the reaction ratio was 99% or more.

SYNTHESIS EXAMPLE 5

Production of Urethane Acrylate
(UA5: Component B)

(1) Into a three-necked flask having an internal volume of 5 liter equipped with a stirrer, thermoregulator, thermometer and condenser was charged 1334 g (12 mol equivalent) of isophorone diisocyanate and 0.5 g of dibutyltin dilaurate, and heated so that the inner temperature reached 70° C. with a water bath.

(2) Liquid prepared by uniformly mixing and dissolving 1416 g (12.2 mol equivalent) of 2-hydroxyethyl acrylate and 1.5 g of hydroquinone monomethyl ether was charged into a dropping funnel equipped with a side tube. The liquid in this dropping funnel was dropped at constant rate for 6 hours with heating the content in the flask of the above-mentioned operation (1) while maintaining the inner temperature of the flask at 65 to 75° C., and the content was stirred at the same temperature for 4 hours to cause reaction, to obtain a urethane acrylate (UA5). Completion of the reaction was judged by measurement of the remaining isocyanate equivalent, to confirm that the reaction ratio was 99% or more.

SYNTHESIS EXAMPLE 6

Production of Epoxy Acrylate
(EA1: Component b1)

Into a three-necked flask having an internal volume of 2 liter equipped with a stirrer, thermoregulator, thermometer and condenser was charged 958 g of bisphenol A type epoxy resin (Epikote 1001 manufactured by Yuka Shell Epoxy K.K., epoxy equivalent: 479), 144 g of acrylic acid, 11 g of dimethylaminoethyl methacrylate, 78.6 g of tetrahydrofurfuryl acrylate, 1.1 g of hydroquinone-monomethyl ether and 0.5 g of 2,6-di-tertiarybutyl-4-methylphenol, and they were reacted at 95° C. for 24 hours. Completion of the reaction was conducted by measurement of acid value, and it was confirmed that the acid value was 1 mg KOH/g, and a mixture of 80% by weight of bisphenol A type epoxy acrylate (EA1) and 20% by weight of tetrahydrofurfuryl acrylate was obtained. The resulted mixture was subjected for GPC measurement, to find that the weight-average molecular weight of the epoxy acrylate (EA1) was 2360.

SYNTHESIS EXAMPLE 7

Production of Epoxy Acrylate
(EA2: Component b1)

Into a three-necked flask having an internal volume of 5 liter equipped with a stirrer, thermoregulator, thermometer and condenser was charged 756 g of bisphenol A type epoxy resin (Epikote 828 manufactured by Yuka Shell Epoxy K.K., epoxy equivalent: 189), 288 g of acrylic acid, 10.4 g of dimethylaminoethyl methacrylate, 263.9 g of tetrahydrofurfuryl acrylate, 1 g of hydroquinone monomethyl ether and 0.5 g of 2,6-di-tertiarybutyl-4-methylphenol, and they were reacted at 95° C. for 24 hours. Completion of the reaction was conducted by measurement of acid value, and it was confirmed that the acid value was 1 mg KOH/g, and a mixture of 809 by weight of bisphenol A type epoxy acrylate (EA2) and 20% by weight of tetrahydrofurfuryl acrylate was obtained. The resulted mixture was subjected for GPC measurement, to find that the weight-average molecular weight of the epoxy acrylate (EA2) was 700.

SYNTHESIS EXAMPLE 8

Production of Photo-curable Silicone
(CS1: Component D)

Into a four-necked flask having an internal volume of 3 liter equipped with a stirrer, thermometer and condenser was charged 2000 parts of isopropanol silica sol (dispersing medium: isopropanol, $SiO_2$ concentration: 30 wt %, primary particle size: 12 mg, trade name: IPA-ST, manufactured by Nissan Chemical Industries, Ltd., herein after referred to as "IPA-ST") and 382 g of 3-methacryloyloxypropyltrimethoxysilane (trade name: TSL-8370, manufactured by Toshiba Silicon K.K., herein after referred to as "TSL-8370"), and the mixture was heated while stirring, and 150 parts of distilled water was gradually dropped simultaneously with initiation of reflux of a volatile component. After completion of dropping, hydrolysis was conducted while stirring for 2 hours under reflux.

After completion of hydrolysis, volatile components such as alcohol and water were distilled under normal pressure, and 600 parts of toluene was added when the concentration of solid content (600 parts of SiO2 of IPA-ST and 317 parts of TSL-8370, total 917 parts) was about 60% by weight, and alcohol and water were azeotropically distilled together with toluene. Next, 1500 parts of toluene was added in separate portions, solvent substitution was completely conducted, to give a toluene dispersion system. At this stage, the solid concentration was about 40% by weight.

Further, a reaction was conducted at 110° C. for 4 hours while distilling toluene, to give a solid concentration of about 60% by weight. Thereafter, 100 parts of methoxypropanol was further added, toluene was distilled off to conduct solvent substitution, giving a methoxypropanol dispersion system.

The resulted photo-curable silicone (hereinafter, referred to as "SC-1") was yellow, transparent and viscous liquid as Newtonian fluid, and had a viscosity at 25° C. of 30 mP·s. The solid concentration was 58% by weight as the heated residue. This heated residue is represented by [weight (g) after heating/weight (g) before heating]×100 (wt %), and the heating condition include 105° C. and 3 hours.

Using the compounds obtained in the above-mentioned Synthesis Examples 1 to 4, the following examples was conducted. "Skew" in the examples means the maximum tilt angle along radius direction to the optical transmittance layer side at the outermost periphery of an optical disc.

EXAMPLE 1

(1) Preparation of Active Energy Ray Curable Composition For Formation of Optical Transmittance Layer:

50 parts of the urethane acrylate (UA1) obtained in Synthesis Example 1 as the component (A), 18.75 parts of a mixture of the bisphenol A type epoxy acrylate (EA1) and tetrahydrofurfuryl acrylate, as the component (B) (15 parts of EA1, and 3.75 parts of tetrahydrofurfuryl acrylate), 16.25 parts of tetrahydrofurfuryl acrylate, 15 parts of isobonyl acrylate, and 2 parts of 1-hydroxycyclohexylphenylketone as the component (C) were mixed and dissolved, to obtained a active energy ray curable composition for formation of optical transmittance layer (for coating optical disc).

The resulted composition was colorless and transparent and was viscous liquid having a viscosity at normal temperature (25° C.) of about 6000 mPa·s. The volume shrinkage coefficient was calculated from the liquid specific gravity of the composition and the solid specific gravity of the cured substance, as a result, it was 6.5%.

In its evaluation, volume shrinkage coefficient of 7.5% or less was permissible range.

(2) Production and Evaluation of Optical Disc For Evaluation

On a transparent disc substrate (diameter: 12 cm, plate thickness: 1.2 mm, tilt angle: 0°) in optical disc shape obtained by injection molding of a polycarbonate resin (Panlite AD 9000TG manufactured by Teijin Kasei K.K.), an aluminum alloy was sputtered to give a thickness of 50 nm by a sputtering apparatus CDI-900 manufactured by Balzers K.K., to obtain an optical disc having an aluminum alloy reflection membrane as a recording layer. On the aluminum alloy reflection membrane of this optical disc, the above-mentioned curable composition was coated using a spin coater to give an average thickness of 100 μm. This coated membrane was cured by a high pressure mercury lamp (120 W/cm) having a lamp height of 10 cm at energy quantity of an accumulated light quantity of 1000 mJ/cm², to obtain an optical disc for evaluation having an optical transmittance layer (cured coating layer) of the above-mentioned curable composition.

The tilt angle of this optical disc was measured using an optical disk optical mechanical property measuring apparatus (DLD-3000, manufactured by Japan EM K.K.) under environments of 20° C. and 50% RH, to find that the tilt angle of 0.1°, showing excellent mechanical property. Further, this optical disc was aged under environments of 80° C. and 85% RH for 100 hours, then, removed and left under environments of 20° C. and 50% RH for 100 hours, and the tilt angle was measured again, to find that the tilt angle of 0.2°, showing excellent mechanical property. The permissible range of the tilt angle was from 0 to 0.3° both at the initiation and after the durability test.

The aluminum alloy surface was observed at a magnification of 800 by a microscope, as a result, corrosions such as whitening and pinhole did not occur, showing excellent recording layer protective ability.

According to JIS K-5400, the pencil hardness of the cured coating layer was measure to find it was B, harder than a polycarbonate substrate (pencil hardness: 4B) and regarded as excellent. The permissible range of pencil hardness was 2B or more.

A cured coating layer was peeled at mirror portion of an aluminum alloy surface of an optical disc obtained in the same manner, and the beam transmission of the resulted transparent layer was measured using a spectral photometer U-3400 manufactured by Hitachi, Ltd. at a wavelength of 400 nm to find that it was 85%, meaning excellent beam transmittance. The permissible range of beam transmittance was 70% or more.

EXAMPLES 2 TO 7, COMPARATIVE EXAMPLES 1 TO 4

Optical discs for evaluation were produced in the same manner excepting that curable compositions shown in Table 1 were used, and evaluated in the same manner. The results are shown in Table 1.

UA5: urethane acrylate obtained in Synthesis Example 5 (UA1)

M315: acrylate manufactured by Toagosei Co., Ltd. (mixture of 90% of tris(2-acryloyloxyethyl) isocyanurate and 10% of bis(2-acryloyloxyethyl)hydroxyethyl isocyanurate)

M313: acrylate manufactured by Toagosei Co., Ltd. (mixture of 65% of tris(2-acryloyloxyethyl) isocyanurate and 35% of bis(2-acryloyloxyethyl)hydroxyethyl isocyanurate)

THFA: tetrahydrofurfuryl acrylate
IBXA: isobonyl acrylate
TCA: tricyclodecanyl acrylate
TCDA: tricyclodecane dimethanol diacrylate
TMPFA: trimethylolpropane formal monoacrylate
MEDOA: 2-methyl-2-ethyl-1,3-dioxolanylmethyl acrylate
NPGDA: neopentyl glycol diacrylate
C9DA: 1,9-nonanediol diacrylate

TABLE 1

|  |  |  | Example | | | | | | | Comparative Example | | | |
|---|---|---|---|---|---|---|---|---|---|---|---|---|---|
|  |  |  | 1 | 2 | 3 | 4 | 5 | 6 | 7 | 1 | 2 | 3 | 4 |
| Curable composition | Component (A) | UA1 | 50 |  |  | 55 | 60 | 60 | 65 |  |  |  |  |
|  |  | UA2 |  | 60 |  |  |  |  |  |  |  |  |  |
|  |  | UA3 |  |  | 45 |  |  |  |  |  |  |  |  |
|  | Component (B) | EA1 | 15 |  |  |  |  |  |  | 15 |  |  |  |
|  |  | EA2 |  |  |  |  |  |  |  |  |  |  | 10 |
|  |  | UA4 |  |  |  |  |  |  |  | 50 |  |  |  |
|  |  | UA5 |  |  |  |  |  |  |  |  | 60 |  |  |
|  |  | M315 |  | 10 |  | 10 | 10 |  |  |  | 10 | 70 |  |
|  |  | M313 |  |  | 15 |  |  | 5 | 5 |  |  |  |  |
|  |  | THFA | 20 | 25 | 20 | 20 | 20 | 25 |  | 20 | 25 | 30 | 5 |
|  |  | IBXA | 15 | 5 |  |  |  |  | 5 | 15 | 5 |  |  |
|  |  | TCA |  |  | 5 |  |  |  |  |  |  |  |  |
|  |  | TCDA |  |  | 15 |  |  |  |  |  |  |  |  |
|  |  | TMPFA |  |  |  | 15 |  |  |  |  |  |  |  |
|  |  | MEDOA |  |  |  |  | 10 |  |  |  |  |  |  |
|  |  | NPGDA |  |  |  |  |  |  |  |  |  |  | 40 |
|  |  | C9DA |  |  |  |  |  |  | 15 |  |  |  |  |
|  |  | TMPTA |  |  |  |  |  | 10 | 10 |  |  |  | 45 |
|  | Component (C) | HCPK | 2 | 2 | 2 | 2 | 2 | 3 | 3 | 2 | 2 | 2 |  |
|  |  | BNP |  |  |  |  |  |  |  |  |  |  | 6 |
|  |  | EPA |  |  |  |  |  |  |  |  |  |  | 3 |
|  | Viscosity of composition (mPa · s) |  | 6000 | 6300 | 5000 | 2500 | 3000 | 3400 | 5300 | 3000 | 3500 | 160 | 25 |
| Evaluation results | Beam transmittance (%) |  | 85 | 88 | 88 | 88 | 88 | 88 | 88 | 85 | 89 | 85 | 57 |
|  | Pencil hardness |  | B | B | B | B | B | B | B | 6B | HB | 2H | H |
|  | Volume shrinkage coefficient (%) |  | 6.5 | 6.1 | 7 | 6.5 | 6.6 | 6.5 | 6.3 | 6.5 | 8 | 10 | 12.5 |
|  | Initial tilt angle (°) |  | 0.1 | 0.1 | 0.1 | 0.1 | 0.1 | 0.1 | 0.1 | 0.1 | 0.4 | Note 1 | Note 1 |
|  | Tilt angle after test |  | 0.2 | 0.2 | 0.25 | 0.2 | 0.2 | 0.2 | 0.2 | 0.2 | 0.9 | Note 1 | Note 1 |
|  | Corrosion resistance |  | Good | Good | Good | Good | Good | Good | Good | Good | Good | Good | Good |

Abbreviations in Table 1 are as described below.

Note: Tilt angle is by far out of the measurement possible range (±1°) of a measuring apparatus, and measurement is impossible.

UA1: urethane acrylate obtained in Synthesis Example 1 (UA1)
UA2: urethane acrylate obtained in Synthesis Example 2 (UA2)
UA3: urethane acrylate obtained in Synthesis Example 3 (UA3)
EA1: epoxy acrylate obtained in Synthesis Example 6 (EA1)
EA2: epoxy acrylate obtained in Synthesis Example 7 (EA2)
UA4: urethane acrylate obtained in Synthesis Example 4 (UA1)

TMPTA: trimethylolpropane triacrylate
HCPK: 1-hydroxy-cyclohexylphenylketone
BNP: benzophenone
EPA: ethyl p-dimethylaminobenzoate

EXAMPLE 8

An optical disc for evaluation was produced in the same manner as in Example 1 except that the curable composition in Example 2 was used and pure silver (purity: 99.99%) was used as a sputtering target, and evaluated in the same manner. In this example, excellent values equivalent to those in Example 1 were obtained in all of beam transmittance, mechanical property, pencil hardness, initial tilt angle, tilt angle after test, and corrosion resistance.

EXAMPLE 9

(1) Preparation of Curable Composition For Hard Coat Layer:

86.2 parts of the photo-curable silicone (CS1) obtained in Synthesis Example 8 (containing 50 parts of solid component and 36.2 parts of propylene glycol monomethyl ether as a solvent component) as the component (D), 47 parts of dipentaerythritol hexaacrylate as the component (E), 6 parts of a photopolymerization initiator (Irgacure 184, manufactured by Chiba Specialty Chemicals K.K.) as the component (C) and 3 parts of polyether-modified silicone L-7001 manufactured by Nippon Unicar K.K. were mixed and dissolved, to obtain a curable composition for hard coat layer.

(2) Formation of Hard Coat Layer and Evaluation Thereof:

On the optical transmittance layer of the optical disc for evaluation obtained in Example 1, the above-mentioned curable composition for hard coat layer was painted using a spin coated to give an average thickness of 2 µm, and left for 1 minute at room temperature, and methoxypropanol contained in the composition was evaporated. Thereafter, this coated layer was cured by a high pressure mercury lamp (120 W/cm) having a lamp height of 10 cm at energy quantity of an accumulated light quantity of 1000 mJ/cm$^2$, to obtain an optical disc having a recording layer, optical transmittance layer and hard coat layer.

The tilt angle of this optical disc was measured using an optical disk optical mechanical property measuring apparatus (DLD-3000, manufactured by Japan EM K.K.) under environments of 20° C. and 50% RH, to find that the tilt angle of 0.51°, showing excellent mechanical property. Further, this optical disc was left under environments of 80° C. and 85% RH for 100 hours, then, removed and left under environments of 20° C. and 50% RH for 100 hours, and the tilt angle was measured again, to find that the tilt angle of 0.25°, showing excellent mechanical property.

Further, after this test, the aluminum alloy surface was observed at a magnification of 800 by a differential interference microscope, as a result, corrosions such as whitening and pinhole did not occur, showing excellent protective ability.

According to JIS K-5400, the pencil hardness of the cured coating layer was measure to find it was F, and the layer was not scratched even if abraded with steel wool #0000, showing very excellent abrasion scratch resistance.

A protective layer and a hard coat layer were peeled as an integrated body from an aluminum alloy surface of an optical disc obtained in the same manner, and the beam transmission of the resulted transparent layer was measured using a spectral photometer U-3400 manufactured by Hitachi, Ltd. at a wavelength of 400 nm to find that it was 85%, meaning excellent beam transmittance.

INDUSTRIAL APPLICABILITY

As described above, the composition of the present invention can form a cured coating layer showing low volume shrinkage coefficient in polymerization, having excellent transparency, and having excellent hardness, recording layer protective ability and mechanical property. By this composition, for example, it is possible to obtain a high density type optical disc having an optical transmittance layer of about 100 µm. This optical disc is extremely useful as an optical disc for conducted reading and/or writing using blue laser.

The invention claimed is:

1. An optical disc, comprising:
    a cured coating layer obtained by curing an active energy ray curable composition comprising a urethane (meth) acrylate compound (A) having at least one amide group in the molecule, an ethylenically unsaturated compound (B) other than the urethane (meth)acrylate compound (A) and a photopolymerization initiator (C),
    in which the cured coating layer acts as an incident side surface for a recording light and/or a reading light from a laser having a shorter wavelength than a wavelength of a red laser;
    wherein a thickness of the cured coating layer is from 50 to 150 µm; and
    wherein a beam transmittance of the cured coating layer in the wavelength of 400 nm is 80% or more.

2. The optical disc according to claim 1, wherein the urethane (meth)acrylate compound (A) is a urethane (meth) acrylate compound obtained by reacting the following components (a1) to (a4):
    (a1) an amide-containing compound having at least one amide group and at least two hydroxy groups in the molecule,
    (a2) a poly-hydric alcohol compound other than said component (a1),
    (a3) a diisocyanate compound, and
    (a4) a hydroxy group-containing (meth)acrylate.

3. The optical disc according to claim 1, wherein a hard coat layer is laminated on the cured coating layer.

4. The optical disc according to claim 3, wherein the hard coat layer is a layer obtained by curing a curable composition containing organic-coated silica (D) obtained by condensation of colloidal silica fine particles (d1) and a hydrolysis product (d2) of an organic silane compound.

5. The optical disc according to claim 4, wherein the hydrolysis product (d2) is a silanol compound obtained by hydrolysis of a monomer of the following general formula (II):

wherein, X represents a methacryloyloxy group, acryloyloxy group, styryl group or vinyl group, $R_4$ represents a direct bond or a linear or branched alkyl group having 1 to 8 carbon atoms, $R_5$ and $R_6$ represent a linear or branched alkyl group having 1 to 8 carbon atoms, a represents an integer of 1 to 3, b represents an integer of 0 to 2, and a+b represents an integer of 1 to 3.

6. The optical disc according to claim 3, wherein the thickness of the hard coat layer is from 0.1 to 5 µm.

7. The optical disc according to claim 3, wherein the beam transmittance of two layers of the cured coating layer and hard coat layer within the wavelength range from 380 to 800 nm is 70% or more.

* * * * *